United States Patent
Chickering et al.

(10) Patent No.: US 8,480,495 B2
(45) Date of Patent: Jul. 9, 2013

(54) SOCIAL REWARDS FOR ONLINE GAME PLAYING

(75) Inventors: David M. Chickering, Bellevue, WA (US); Christopher A. Meek, Kirkland, WA (US); Bryan N. Culbertson, Easton, PA (US)

(73) Assignee: Microsoft Corporation, Redmond, WA (US)

( * ) Notice: Subject to any disclaimer, the term of this patent is extended or adjusted under 35 U.S.C. 154(b) by 1729 days.

(21) Appl. No.: 11/614,588

(22) Filed: Dec. 21, 2006

(65) Prior Publication Data

US 2008/0153595 A1 Jun. 26, 2008

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .......................................................... 463/42

(58) Field of Classification Search
USPC .......................................................... 463/42
See application file for complete search history.

(56) References Cited

U.S. PATENT DOCUMENTS

| | | | |
|---|---|---|---|
| 5,950,200 A * | 9/1999 | Sudai et al. | 1/1 |
| 2004/0032082 A1* | 2/2004 | Vincent | 273/254 |
| 2004/0167882 A1* | 8/2004 | Thomson et al. | 707/3 |
| 2004/0254809 A1* | 12/2004 | Teicher | 705/1 |
| 2005/0014118 A1 | 1/2005 | von Ahn Arellano et al. | |
| 2006/0167874 A1 | 7/2006 | von Ahn Arellano et al. | |
| 2006/0179053 A1 | 8/2006 | von Ahn Arellano et al. | |

OTHER PUBLICATIONS

"Hot or not", Mar. 31, 2001, http://web.archive.org/web/20010331091915/http://www.hotornot.com/.*
OkCupid via archive.org, Aug. 29, 2005-Aug. 30, 2005, FAQ and FAAAQ! pages (http://replay.waybackmachine.org/20050830190131/http://www.okcupid.com/static?p=faq and http://replay.waybackmachine.org/20050829122408/http://www.okcupid.com/static?p=faaaq).*

* cited by examiner

*Primary Examiner* — Michael Cuff
*Assistant Examiner* — Kevin Y Kim
(74) *Attorney, Agent, or Firm* — Lee & Hayes, PLLC

(57) ABSTRACT

Useful information is acquired from a community of individuals by way of a game that rewards participants with social information about other participants. Points can be awarded to participants simply for participation and/or as a function of game performance. Such points can subsequently be exchanged to reveal information about game partners or other community members. Among other things, such a reward system can motivate individuals to perform tasks that might not otherwise be compelling and/or enjoyable.

18 Claims, 12 Drawing Sheets

SOCIAL REWARDS FOR ONLINE GAME PLAYING

BACKGROUND

The ubiquity of computers and like devices has resulted in digital data proliferation. Although originally the sole domain of well-funded companies and research institutions, technology advancements and cost reductions over time have enabled computers to become commonplace in the lives of most everyone. Individuals interact with a plurality of computing devices daily including work/school computers, home computers, laptops and mobile devices such as phones, personal digital assistants, media players and/or hybrids thereof. Consequently, an enormous quantity of digital data is generated each day including messages, documents, pictures, music, video, etc. Such data is of minimal use unless quality information can be extracted/isolated and/or organized in a manner that facilitates expeditious retrieval.

Automated mechanisms are a standard approach to facilitate location of valuable information. More specifically, conventional algorithms and/or machine learning techniques are employed. For example, a web crawler (a.k.a. spider, robot) comprises automated scripts that browse the World Wide Web (web) in a methodical manner capturing copies of web pages along the way. The captured pages can then be utilized to generate an index that a search engine can use to return relevant results. Such automated mechanisms can also be employed in a variety of other ways such to aid identification of undesired, unsolicited bulk messages known as spam, among other things.

While conventional automated mechanisms seek to replicate human reasoning to classify and organize data, some tasks/activities still require or are more accurate with input from humans. Consider images problems, for example. Technologies have not yet advanced to a point where computers can accurately identify elements within pictures or images. Unfortunately, humans are unlikely to be very interested in providing required data.

One solution to this dilemma leverages people's affinity for computer games. Online games provide a mechanism to collect information from human beings by engaging them in an interactive game.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to provisioning of social rewards to further encourage engagement in activities such as games that acquire useful information from human participants. For some information gathering tasks, it is difficult to design a game that is fun enough to compel people to play. For example, consider a task that involves labeling messages as spam or non-spam. By providing social information and/or connections to participants, individuals are further motivated to play a game regardless of its inherent level of fun or entertainment.

According to an aspect of this disclosure, an information collection system is provided that includes a game component and a social reward component. The game component provides a cooperative or competitive game or activity designed to collect a particular type of information. The social reward component provides motivation to participate or otherwise continue playing by revealing information to participants about other participants.

In accordance with another aspect of the disclosure, a mechanism is provided for purchasing social information. In particular, users can earn points as a function of game participation and/or performance (e.g., single game score, overall score . . . ). The points can subsequently be exchanged for social information about other participants, such as game partners.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Provided are systems and methods related to affording social rewards for activity participation. Capture of human knowledge and/or computational abilities can be obtained through specially designed activities such as games. While some data tasks lend themselves to entertaining games, others can be tedious or boring. To motivate participation in games of various levels of fun, information about activity participants can be proffered as a function of participation and/or performance, among other things. In effect, humans' social nature is leveraged to facilitate information collection by revealing to participants social information about and/or connections to other players.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
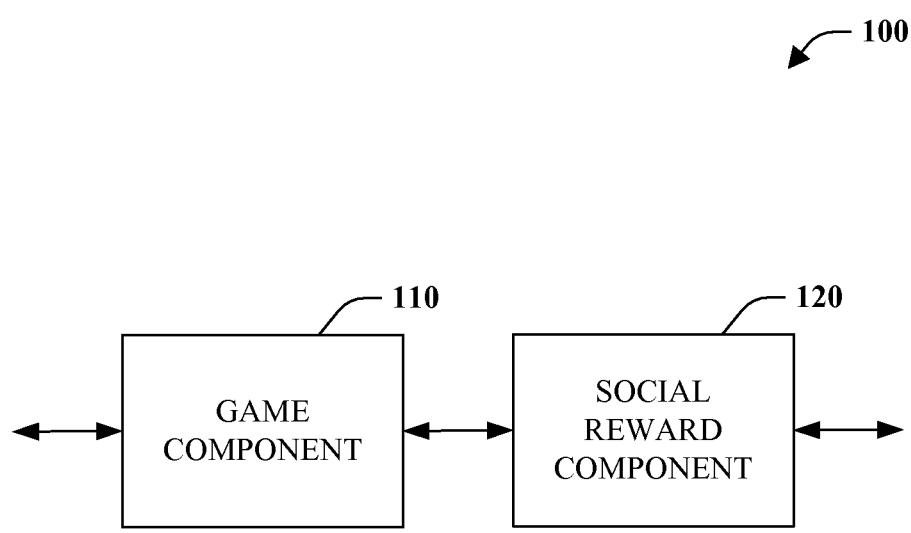
FIG. 1 is a block diagram of an information collection system.

Referring initially to FIG. 1, an information collection system 100 is illustrated. The system 100 includes a game component 110 that provides an activity or game that collects useful information from its human participants such as that which reflects a human decision, evaluation and/or categorization of a data item or piece of information. Such a game can include one or more participants and be cooperative, competitive or some hybrid thereof. The game component 110 is communicatively coupled to social reward component 120. Reward component 120 facilitates provisioning of social and/or demographic information about other participants as a reward for participating in the game provided by game component 110.

By way of example and not limitation, for many information-gathering tasks it is difficult to design a particularly fun game because an information collection task is particularly tedious and/or boring. For instance, suppose a set of users' activity is to label email or web pages as spam or non-spam. It is unlikely that most people would find this labeling task compelling. To motivate users to perform tasks that ordinarily might not be fun on their own, social information/connections can be revealed as a function of participation and/or performance. In one instance, name, gender, ethnicity, marital status, political affiliation, photographs, email address, personal web pages and/or location can be exposed with respect to a current or past game participant upon obtaining a score that exceeds a threshold or participating in a predetermined number of games.

Figure 2:
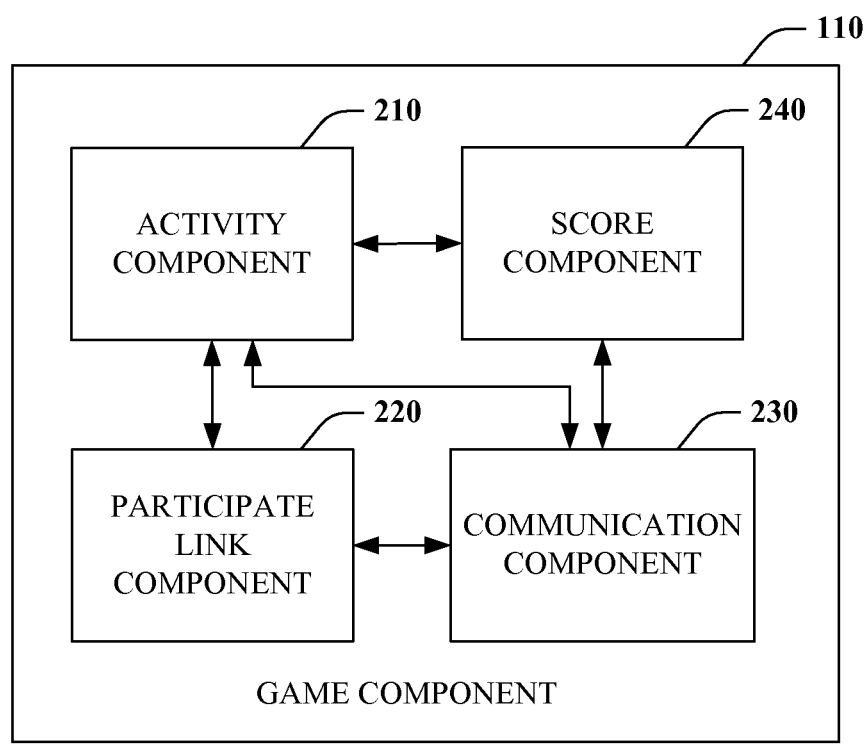
FIG. 2 is a block diagram of a representative game component.

FIG. 2 depicts a representative game component 110. Activity component 210 provides an activity, task and/or game designed to collect particular information from users. A myriad of applications are possible including, without limitation, labeling messages as spam or non-spam, annotating images with descriptive text, matching questions with answers in a question and answer system, and ranking search results. Accordingly, the activity component 210 supplies the data and functionality related to interacting with users to collect information from them. This can involve interaction with a database, service and/or the like (not shown), retrieving data and persisting gathered information of later use or analysis. The activity component 210 is communicatively coupled to participant link component 220, communication component 230 and scoring component 240.

The participant link component 220 is a mechanism that links at least one participant to a game session created by activity component 210. Depending upon activity, a game can include one or more participants. Where a game requires more than one player, participants are divided into particular groupings (e.g., pairs) appropriate for a gaming session. The divisions can be random or divided for particular reasons. In one case, users can request participants with particular characteristics such as a participant gender, educational level, ethnicity and/or location among other things. Furthermore, the link component 220 can pair users to support gaming tournaments or the like. Still further yet, users can be paired with an automated participant in instances where needed for a game session and/or to monitor and/or isolate actions of particular users for security or data integrity purposes.

The communication component 230 provides a mechanism to support communication amongst game participants. Communication can be provided in a variety of manners including, text, pictures, graphics, audio and/or video, inter alia. In one instance, low bandwidth communication of limited number and type can be supported amongst game participants during the game. For example, a user may communicate "good job" after a round of the game. Such messaging allows users to feel more engaged with each other, while still requiring them to participate in the game task in order to learn more information about their partners.

The score component 240 produces and updates scores associated with participant activity. For example, every time participants agree on a label for a message, image or the like or a match of question and answer their score can be incremented by a predetermined amount. This score can be displayed and aggregated over time to provide a metric for comparison between participants and motivate continued play. Additionally, particular milestones (e.g., bronze, silver, gold players) can be set to further motivate participants to continue playing to reach the milestones.

Figure 3:
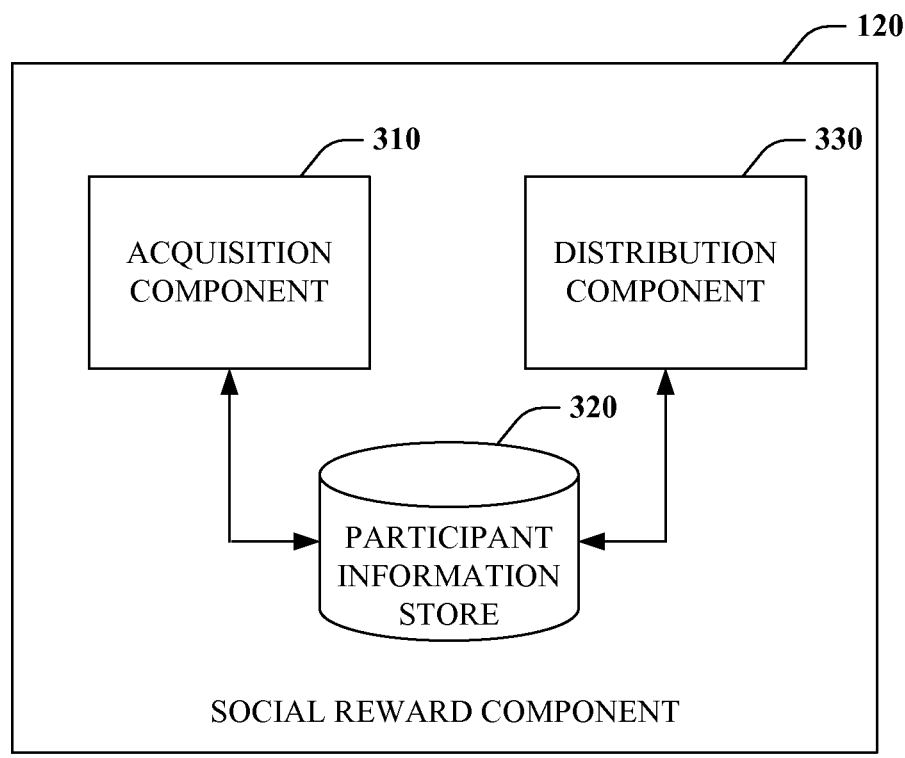
FIG. 3 is a block diagram of a representative social reward component.

FIG. 3 depicts a representative social reward component 120. As previously stated, the reward component 120 can facilitate provisioning of social and/or demographic information to encourage game participation. The reward component 120 includes an acquisition component 310 that receives, retrieves or otherwise obtains or acquires information about participants including without limitation name, gender, ethnicity, education level, email address and/or photograph. Acquired information can then be saved to participant information store 320. The store 320 can be any volatile or non-volatile computer readable medium.

One challenge is how to acquire information without requiring extensive time and effort from players. In one instance, the acquisition component 310 can employ screen scrapping to retrieve this information from a home page, blog, social network site or the like. Scraping or screen scrapping is a mechanism to extract data from displayed output of another program. For example, social networks allow users to display lists of information, which can be scrapped by the acquisition component 310.

Additionally or alternatively, the acquisition component 310 can acquire information with little overhead by providing a fun input mechanism such as by having players answer fun "quiz questions" together. For example, two players can come in anonymously and start playing immediately. After a round of labeling, players are given a small number of questions such as "If you were a superhero, you would be (a) superman . . . ." When both players answer the question, they can see how the other players responded. Fun questions can be selected that are very revealing from a social perspective. Furthermore, because the work to answer the question is happening concurrent with getting the information back from your partners, the perceived overhead is very low.

Distribution component 330 is communicatively coupled to the store 320 and is operable to reveal or otherwise distribute participant information. Distribution can be initiated or controlled by the game component 110 of FIG. 1. For instance, information distribution can occur after completion of a game upon request of a participant that has achieved a threshold game score. By way of example, after completion of a game, players can be given an opportunity to communicate directly with each other via email, instant message, telephone or any other communication medium. For instance, the system might ask both players if they would like to know the email address of their partner. If they both respond affirmatively, then the email addresses can be revealed. The distribution component 330 can also enforce other policies such as ensuring a participant is only able to see information about another participant that he has exposed about himself. Thus, if a participant does not specify his gender, the game will not expose the gender of other players to him, which encourages disclosure.

Figure 4:
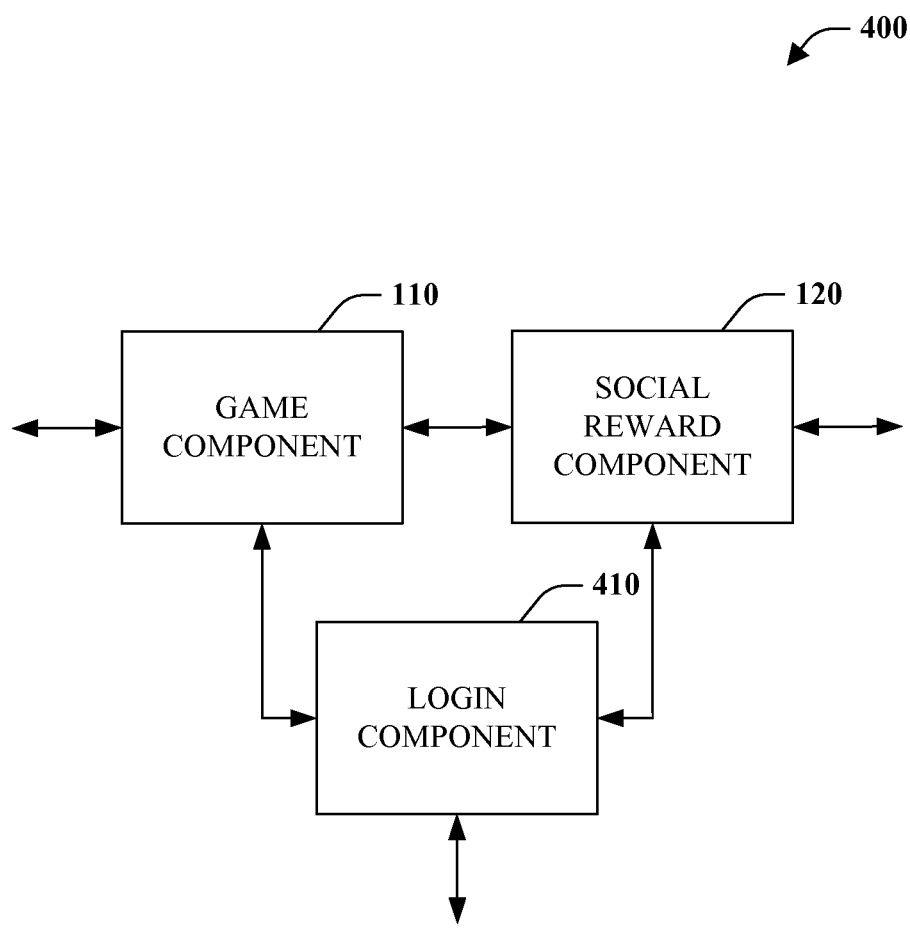
FIG. 4 is a block diagram of an information collection system including a login component.

Turning attention to FIG. 4, an information collection system 400 is shown according to an aspect of the disclosure. The system 400 includes the game component 110 and social reward component 120 as described with respect to FIG. 1. Briefly described, the game component 110 provides an information collection activity or game and the reward component 120 reveals information about participants to other participants as a function of participation and/or performance. Further included is login component 410, which is communicatively coupled to both the game and social reward components 110 and 120, respectively. The login component 410 provides a mechanism for authenticating and/or authorizing use of the game component 110 and/or the reward component 120. For example, a user can establish a user name and pass code to facilitate unique identification as secure interaction. In one instance, the components 110 and 120 can be network based thus the component 410 can enable access to remote network services providing game and social reward functionality. Further yet, such login information can be utilized with respect to participant linking to a game session. Once a user logs into the system, they can subsequently be linked or paired with other participants that are logged in.

Figure 5:
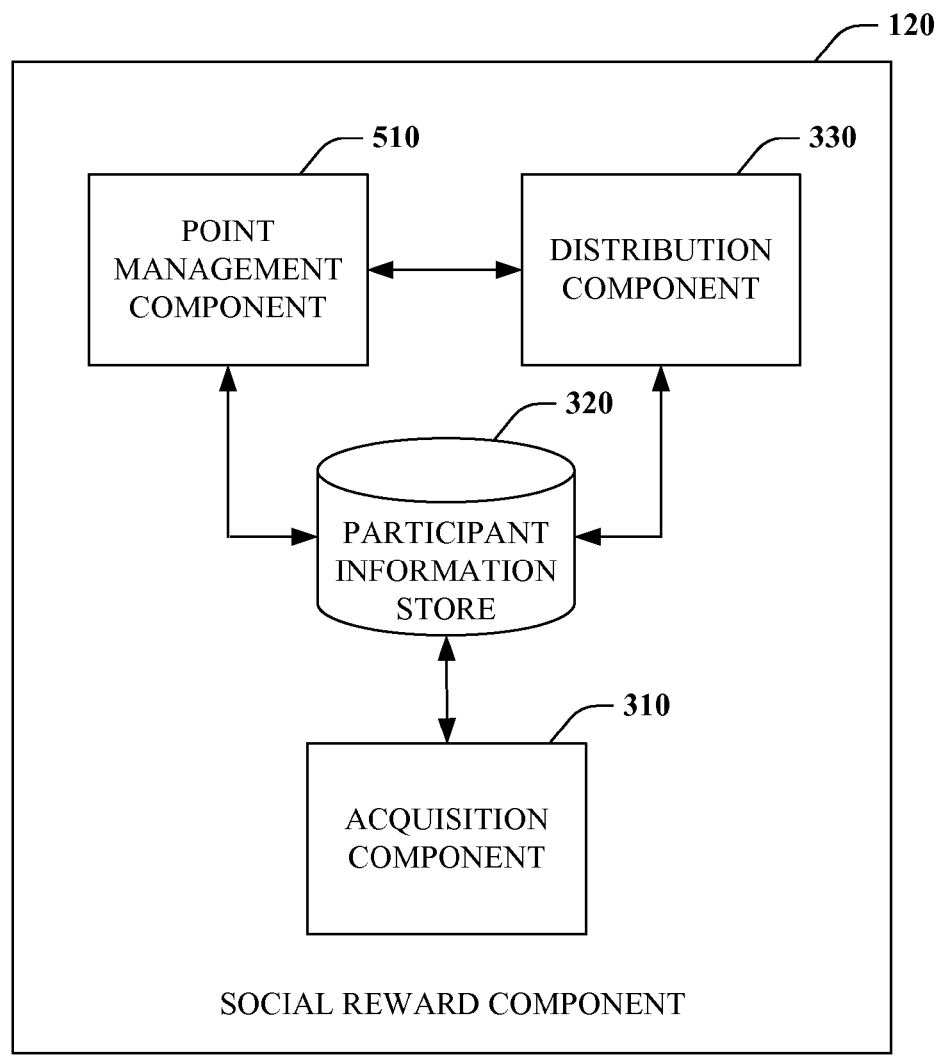
FIG. 5 is a block diagram of a representative social reward component.

FIG. 5 illustrates a representative social reward component 120. Similar to FIG. 3, the social reward component 120 can include the acquisition component 310, the participant information store 320 and the distribution component 330. As previously described, the acquisition component 310 can acquire information from users or participants (e.g., name, gender, email address, message handle, photograph . . . ) and store such information to the participant information store 320. The distribution component 330 is operable to reveal or otherwise provide such information (or that marked as shared) to other participants. In accordance with one aspect of the disclosure, distribution component 330 can reveal at least some information about game participants after a game, for instance if a certain threshold score has been reached. The social reward component 120 can also provide different manners of obtaining participant information including, without limitation, utilization of a point system. This functionality can be provided by point management component 510.

The point management component 510 is communicatively coupled to both the participant information store 320 as well as the distribution component 330. Furthermore, the point management component 510 can receive, retrieve or otherwise obtain data from the game component 110 (FIGS. 1, 2, 4) regarding game participation and/or performance such as user game scores. In this manner, the point management component 510 can make determinations as to if and an amount of points to award a user for game play. These points can be saved and associated with a participant in the store 320, for example in an account record. Earned or awarded points can subsequently be exchanged for social information about participants at any time. For example, distribution component 330 can request that the points management component 510 debit the users account upon revealing information or alternatively deduct the amount itself.

By way of example, points can be utilized for photograph revealing. In particular, a low-resolution version of a photograph supplied by a participant can be displayed to a game partner. Users can pay with points to increase the resolution incrementally. Accordingly, it may take a few rounds of points before the photograph is completely recognizable.

Other versions of this technique can correspond to using different blurring techniques, whereby users can exchange points for a clearer picture.

While the points may be used to reveal information about current game participants, they need not be limited thereto. Users may also utilize points to purchase information about former or potential future partners. In fact, the points may be exchanged for additional functionality or personalization. For example, users could pay for the right to request particular partners or partners with particular characteristics.

Figure 6:
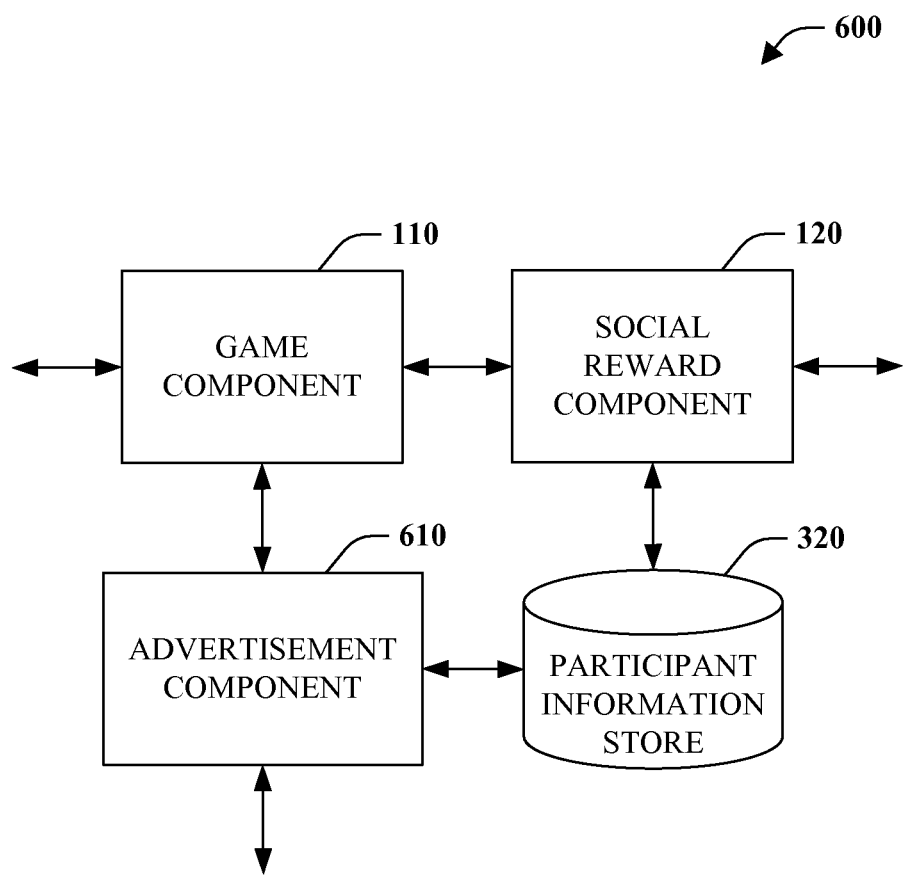
FIG. 6 is a block diagram of an information collection system that employs advertisements.

Referring to FIG. 6, shown is an information collection system 600. Similar to systems 100 and 400 of FIGS. 1 and 4, respectively, the system 600 includes a game component 110 and a social rewards component 120. Further provided is the participant information store 320. The game component 110 is operable to provide an interactive game or activity for collecting useful information. The communicatively coupled reward component 120 can reveal participant information housed in the participant information store 320 to other participants, for example upon reaching a certain score and/or exchange of points. Further provided is advertisement component 610, communicatively coupled to the information store 320 and the game component 110. The advertisement component 110 is operable to inject advertisements into the game provided by the game component 110. The advertisements selected for injection can be based on game content (e.g., questions, images provided for labeling . . . ) and/or information associated with participants as retrieved from the data store 320. In particular, game participants may see the same advertisements selected based on the profiles of all the game participants or different advertisements custom tailored to individual participants. Such advertisements can be injected during game play, initiation and/or termination thereof. For example, targeted advertisements can be provided with a final game score and/or an overall game scoreboard identifying top scorers. In this manner, advertisement revenue and valuable information can be acquired from an information collection system.

Figure 7:
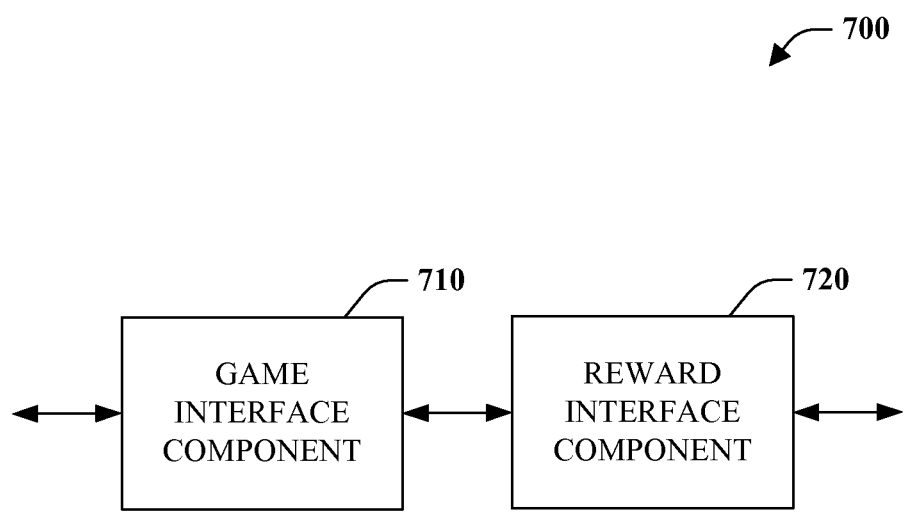
FIG. 7 is a block diagram of an interface connecting game and social reward components.

Turning to FIG. 7, an interface system 700 to facilitate communication between the game component 110 and the social reward component 120 of FIGS. 1, 4 and 6 is illustrated. In one embodiment, system 700 can correspond to an application-programming interface (API) to facilitate and/or define communication between the components. In particular, system 700 includes a game interface component 710 and a reward interface component 720. The game interface component 710 implements or defines method/function calls or commands for the game component 110, while the reward component implements or defines method/function calls or commands for the social reward component 120. The game and interface components 710 and 720, respectively, are communicatively coupled and operable to map communications amongst the components. Accordingly, games such as those utilized to collect information from users can be improved by connecting them to a component that reveals social information and/or connections to participants via the interface system 600.

Similar interfaces can also be utilized in conjunction with interacting with other systems and/or components. For example, an interface can facilitate interaction with functionality captured by the system 100 including both the game component 110 and the social reward component 120, for instance to tie this functionality into other systems and/or components.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

While the described systems and/or components thereof can be utilized alone to collect valuable information, it should also be appreciated that they can be incorporated into other systems. For example, the disclosed mechanism can be incorporated as part of a dating service. By participating in a game together, in a semi-anonymous manner, pairs of people can learn about each other without having to reveal too much information. Players could also be allowed to request partners of a particular gender. Additionally or alternatively, participant profile information can be employed by a search engine, for example to facilitate provisioning of relevant results for the particular user.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the participate link component 220 can employ such mechanisms to intelligently link game participants based on disclosed participant information in an effort to acquire quality results and/or increase participation. Additionally or alternatively, reward component 120 can adjust point values required to reveal information for individual users in a manner that encourages additional participation.

Figure 8:
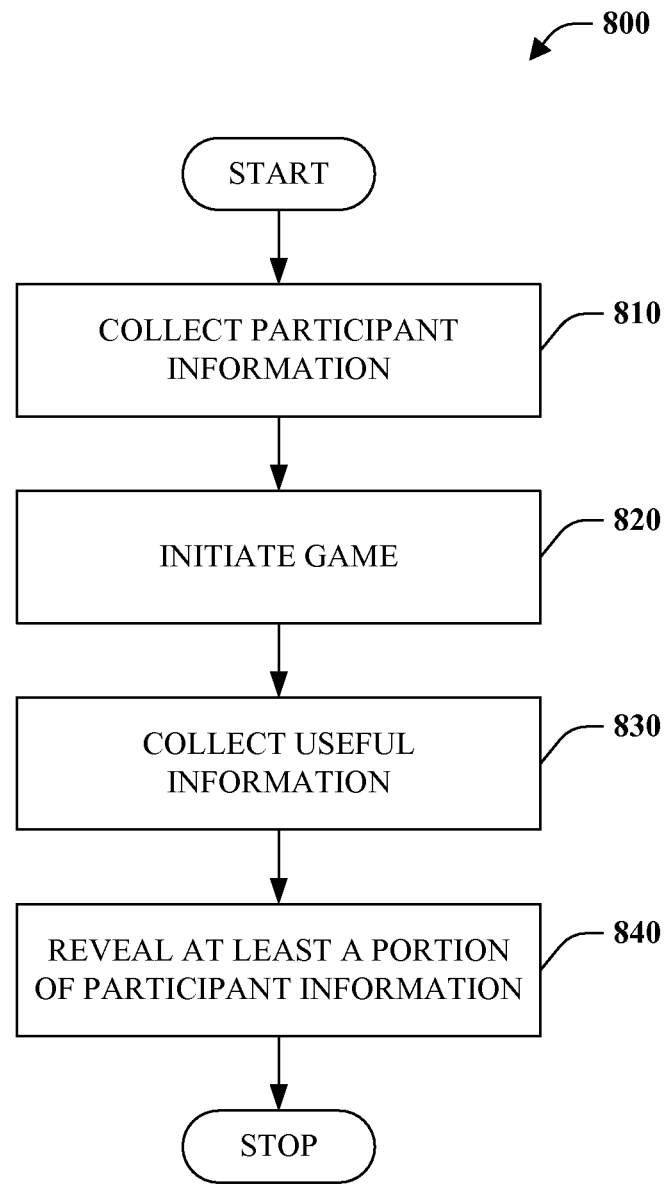
FIG. 8 is a flow chart diagram of a method of information collection.
Figure 9:
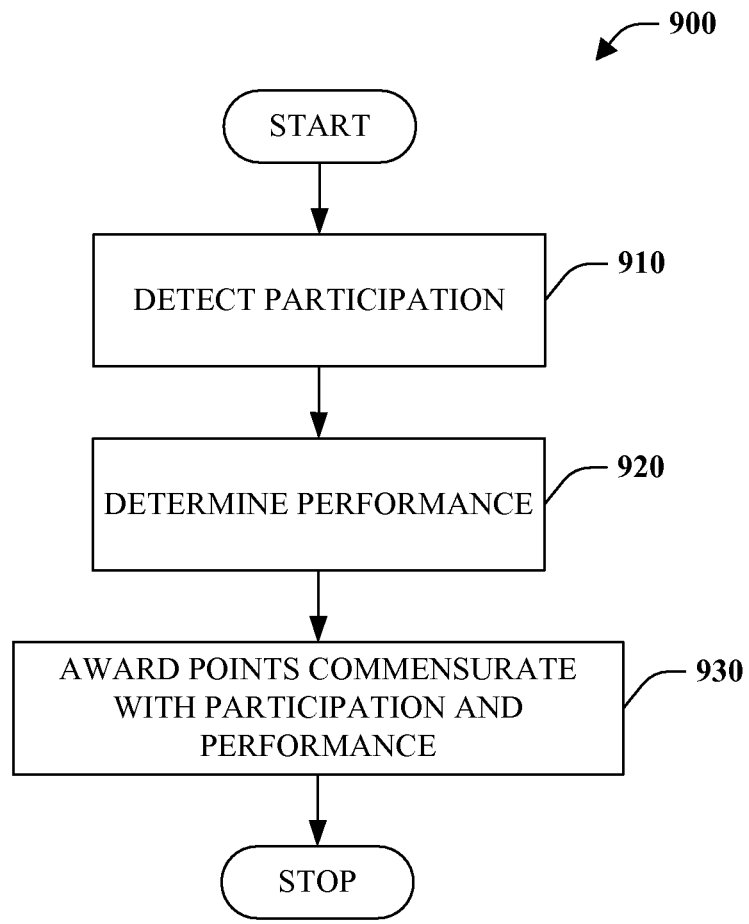
FIG. 9 is a flow chart diagram of a method of point allocation.
Figure 10:
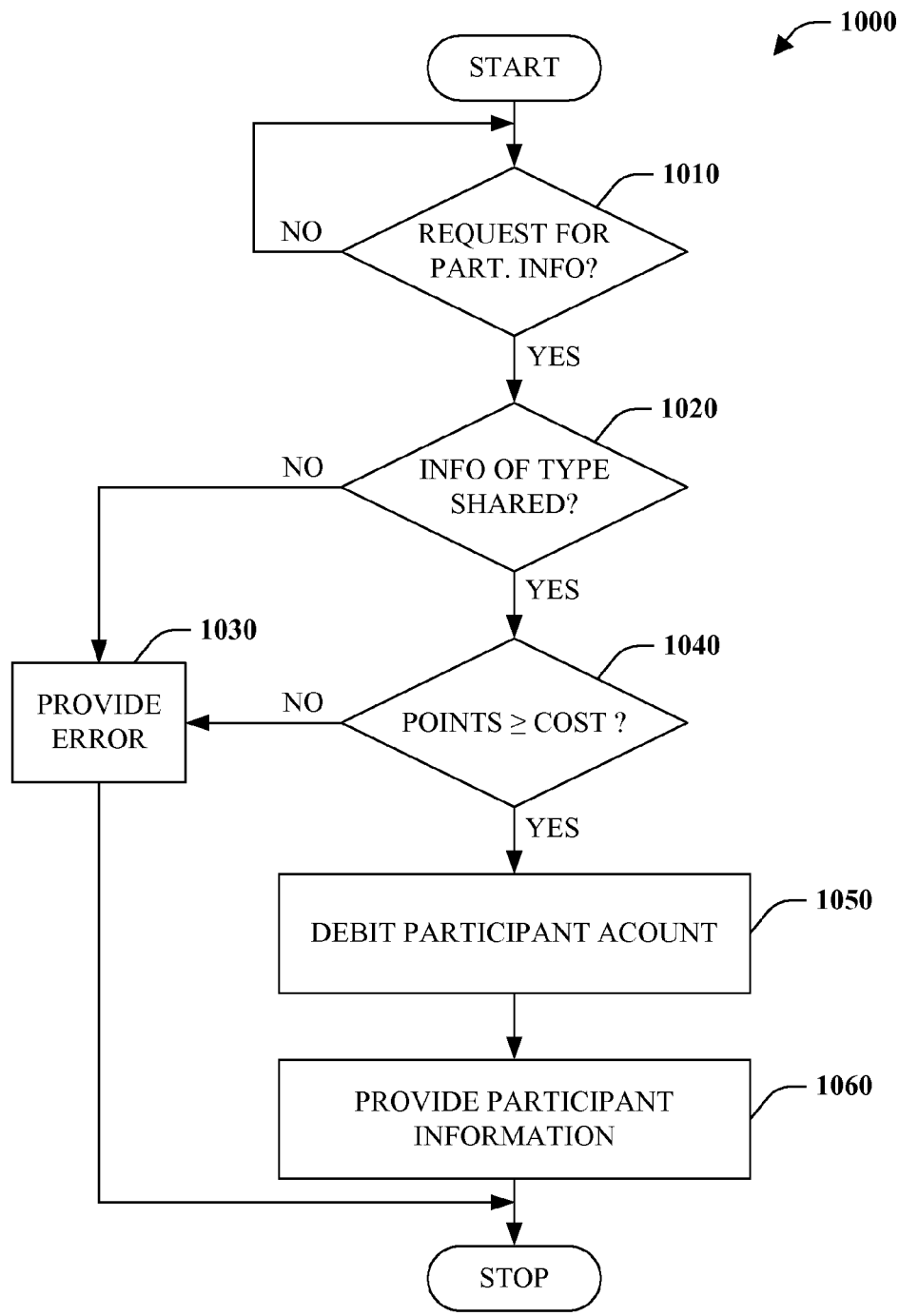
FIG. 10 is a flow chart diagram of a method of point exchange for social information.

In view of the exemplary systems described sura, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 8, a method of information collection 800 is provided. In particular, games or activities can be employed to collect useful information from a community. Such information is often unique and/or more accurate when provided by human beings than other electronic mechanisms, such as identifying spam or graphical elements.

At reference numeral 810, participant information is collected. Participant information can include social, demographic and/or contact information including without limitation, name, gender, marital status, ethnicity, religion, political affiliation, email address, phone number and/or photographs. In essence, a participant profile is constructed of information the participant is willing to share, although other information can be included and designated private or the like.

At numeral 820, a game is initiated. Game initiation can include linking at least one participant to a gaming session and commencing execution of the activity or game. The number of linked participants can be dependant upon game type and/or potential valid requests from participants. Furthermore, automated players can be utilized where the number of available participants is limited or otherwise insufficient.

Collection of useful information such as human observations, evaluations and/or classifications of data, among other things is performed at reference numeral 830. Collection occurs in conjunction with a game or activity. Such information can pertain to spam classification or image identification, among other things. For example, in a question and answer system, where users present questions to a community and others provide answers to the questions, it is often helpful to match answers with related questions. This type of activity is not conducive to automated mechanisms and further yet not inherently fun. Accordingly, a game can be designed in which users are provided with questions and they attempt to match a subset of answers to the questions. Users could then score points where one or more partners agree with their matching. Bonus points could also be awarded for speed of matches and/or number of matches within a given time period, among other things.

At reference numeral 840, at least a portion of participant information is revealed. Previously collected participant information can be supplied to other participants win a myriad of ways. For example, upon completion of a game an option can be given to reveal particular information to the participants about each other upon reaching a threshold score. Additionally or alternatively, information can be purchased with points earned via game participation.

FIG. 9 is a flow chart diagram of a method 900 of point allocation. At reference number 910, game or activity participation is detected. Participation can be detected upon linking users to a game session, during a session or upon completion of a game. At reference 920, game performance is determined. Performance can be measured based on game score, among other things. At numeral 930, points can be awarded commensurate with at least one of participation and performance. For example, a set number of points can be associated with participation in a single game. Furthermore, points can be awarded based on meeting threshold scores and/or based on actual game scores, among other things.

FIG. 10 is method 1000 of information provisioning. At reference numeral 1010, a determination as to whether a request for participant information is received. If no, the method 1000 cycles until a request is received. If yes, the method 1000 proceeds to numeral 1020 where a check is made as to whether the type of information requested has been shared by the individual requesting the information. For example, if a participant's email address is requested then a check is made to determine if the requester is sharing their email address. If the requested information is not provided by the requestor, an error is produced at 1030 and the method terminates. Otherwise, the method 1000 continues at 1040. At reference numeral 1040, a determination is made as to whether the points associated with a requesting participant are greater than or equal to the cost of the information. As previously provided points can be awarded as a function of game participation and/or performance. If the cost is greater, an error is produced at 1030 and the method 1000 terminates. If the condition is satisfied and the cost is less than or equal to the number of points associated with the participant, the participant's account can be debited for the cost of the information at 1050. The requested information can then be provided or revealed to the requesting participant at reference numeral 1060.

What follow is an exemplary information collection system to facilitate clarity and understanding with respect to aspects of the subject disclosure. It is to be appreciated that the exemplary system is not meant to limit the scope of the appended claims, rather, the purpose is to provide context via an exemplary system and sample scenario.

The exemplary system pertains to a question-labeling game in which participants are paired with each other and are rewarded for label agreement. When a user logs into the game, he/she can be paired with an initially anonymous partner. The pair then enters the first round of the game. Each round can comprise two phases: the labeling phase and the social-awareness phase.

The labeling phase of each round of the game can proceed as follows. The pair is given thirty seconds to attach labels to as many questions as they can. The players are shown the same questions in the same order, but each player can work at his own speed. Questions can come from an external question and answer system, and the labels are one of the following:

a. Good question that can be answered well by a single person
   b. Good "opinion poll" question that can be answered well by a community
   c. Not a good question (e.g., stupid question, not written well, etc.)

Before labeling any question, a player may "bank" the question if he/she is interested in seeing community answers later, as described infra. A player can choose the question label independently of his choice of whether or not to bank the question.

The system can have a real-time progress control that displays the progress information to both players in real time during the labeling phase. The progress information may include time remaining in the round, number of questions answered by both players, agreement status of each question answered by both players, current round-score for the players and/or the cumulative game score for an individual player. Furthermore, whenever a player labels a question that his partner has already labeled, an optional audible tone can be presented to both players: if the labels agree, the tone is a positive "ding" sound (or perhaps a "cha-ching" money sound); otherwise, the tone is a negative "buzz" sound.

After thirty seconds, the labeling phase of the round ends and points can be awarded as follows:

a. For each question that both players labeled and for which there is agreement, both players receive 10 points.
   b. For each question that both players labeled and for which there is not agreement, both players receive −10 points.
   c. A player is awarded 5 points if he answers more questions than his partner.

Note that the accumulated points (a) and (b) above can be shown to the players in real time during the labeling phase on the progress control.

If a player has less than 50 points accumulated from the labeling phase, then the partnership is deemed "unsuccessful" and the players can be broken up. The players keep any points they have accumulated, and they may continue the next round with a new (anonymous) player. If the labeling phase is successful, and if the two players have agreed on all of the labels, then both players' points can be doubled.

Following a successful labeling phase, the round enters may enter the social-awareness phase. One of the players can be assigned to be "question master." If this is the first round of the game for a pair of players, then the question master may be chosen at random. Otherwise, the player who was not assigned to be question master in the last round is assigned to be question master in the current round.

The question master can be responsible for choosing a "connection question" for the social-awareness phase of the round. There are two types of connection questions from which the question master can choose:

a. Any question that he has banked in any round
   b. One of three randomly chosen personality assessment questions Both of the question types have multiple-choice answers. For the banked questions, the candidate answers are ones provided by a question and answer community: the choice is which answer is best out of the ones shown. The candidate answers associated with a connection question need not be shown to the question master until he chooses that question as a connection question (players can examine all answers to all banked questions at the end of the game—see below).

While the question master is choosing a connection question, the player who is not the question master chooses between "high-stakes scoring" and "low-stakes scoring" for the social-awareness phase. In high-stakes scoring, social-awareness bonus points are doubled, but players can lose points. In low-stakes scoring, it is not possible to lose points.

After the question master has chosen the connection question and his partner has chosen the stakes, then the stakes, the connection question and the candidate answers can all be revealed to both players. Both players may then be prompted to provide two answers: (1) "what is your answer?" and (2) "what will be your partner answer?" For example, if the connection question is "what is your gender?" a player can select both his own gender and his best guess at his partner's gender.

When both players have provided their two answers to the connection question, the "social awareness" bonus points can be awarded. In high-stakes scoring, a player may receive 100 points if he correctly guesses what answer his partner will provide, but loss 100 points if he does not. In low-stakes scoring, a player may receive 50 points if he correctly guesses his partner's answer and no points otherwise.

At the end of the social-awareness phase, all answers can be revealed to both players in the connection question summary page. This page may include all connection questions and answers from all rounds that the two players have played. For example:

(Y=you, P=partner, A=answer, G=guess)
Connection Question Summary Page

| Connection Question Summary Page | | | | | | |
|---|---|---|---|---|---|---|
| Round | Question Master | Q | YA | PG | PA | YG | Bonus |
| 1 | Player 1 | XYZ | 1 | 2 | 2 | 2 | 50 |
| 2 | Player 2 | ABC | 2 | 2 | 3 | 2 | −100 |
| ... | | | | | | | |

(Y = you, P = partner, A = answer, G = guess)

The idea here is that enough of the questions and answers are shown so that the page reveals information about you and your partner. At the bottom of the connection question summary page, the players may be given three choices: (1) play another round with this partner, (2) play another round with a new partner or (3) quit. If a player decides to quit, he/she can be taken to a page where he/she can browse his banked questions with all associated community answers. If player A chooses to play another round with his partner, but his partner chooses either to quit or to play with a new partner, then player A is informed that he has been "dumped," and can choose to either quit or play with a new partner. If both players choose to continue with the partnership, then each player has the option to send one of a pre-defined set of messages to his partner: (a) "Nice work!" (b) "We can do better than that!"

After every 500 social-awareness bonus points accumulated with the same partner, a player has the option to provide a short text message that will be shown to his partner when (1) his partner also accumulates 500 social-awareness points, and (2) his partner either quits the game or chooses another partner. For example, after accumulating 1000 social-awareness bonus points, player 1 can provide up to two short messages. Player 2 "earns" the first message after attaining 500 social-awareness points, and he earns the second message after attaining 1000 social-awareness points. Due to the high-stakes scoring, messages can become unavailable after being written and/or earned. The text message is meant to provide a short message or contact information. Whenever a player's partner has provided a new text message, this information is provided to that player in order to encourage him to obtain more bonus points.

As used herein, the terms "component," "system," "service" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
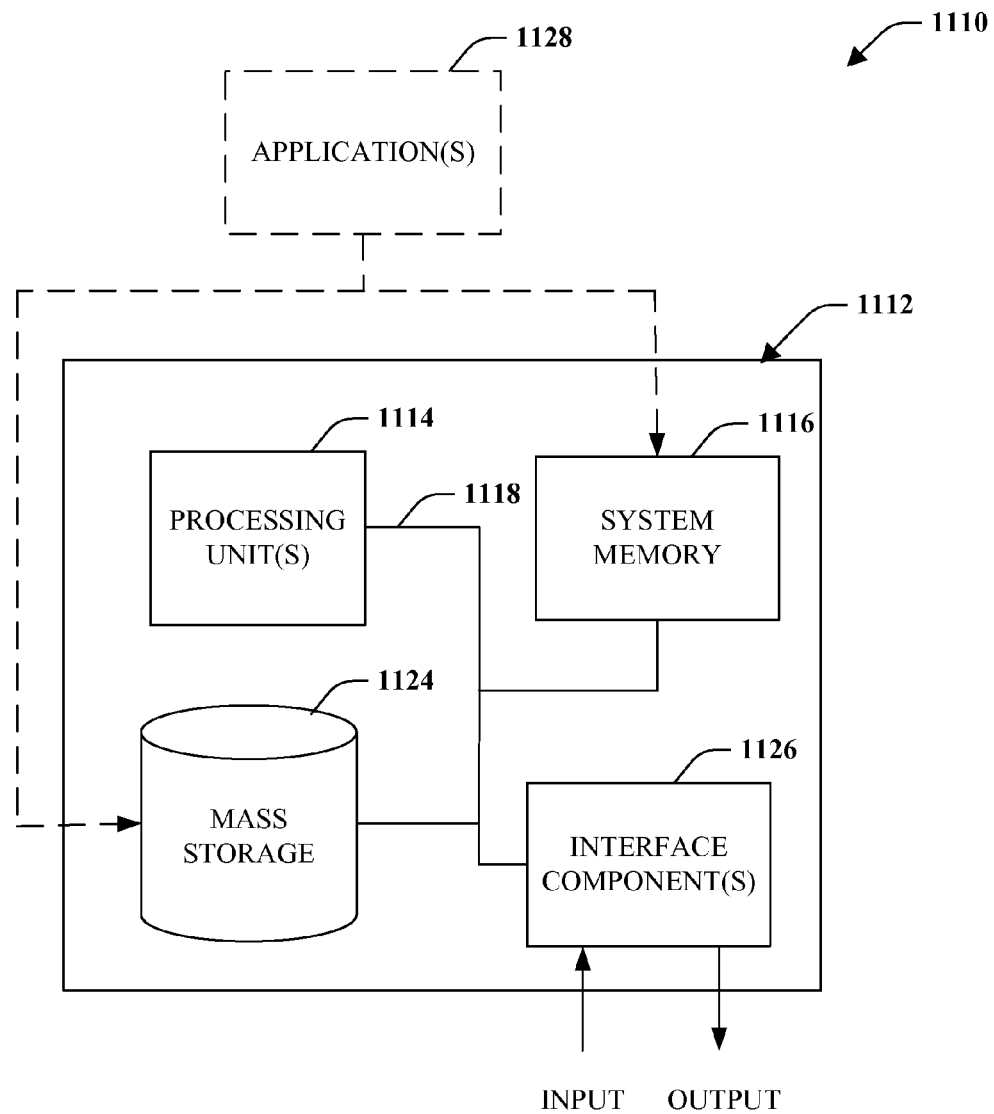
FIG. 11 is a schematic block diagram illustrating a suitable operating environment for aspects of the subject innovation.
Figure 12:
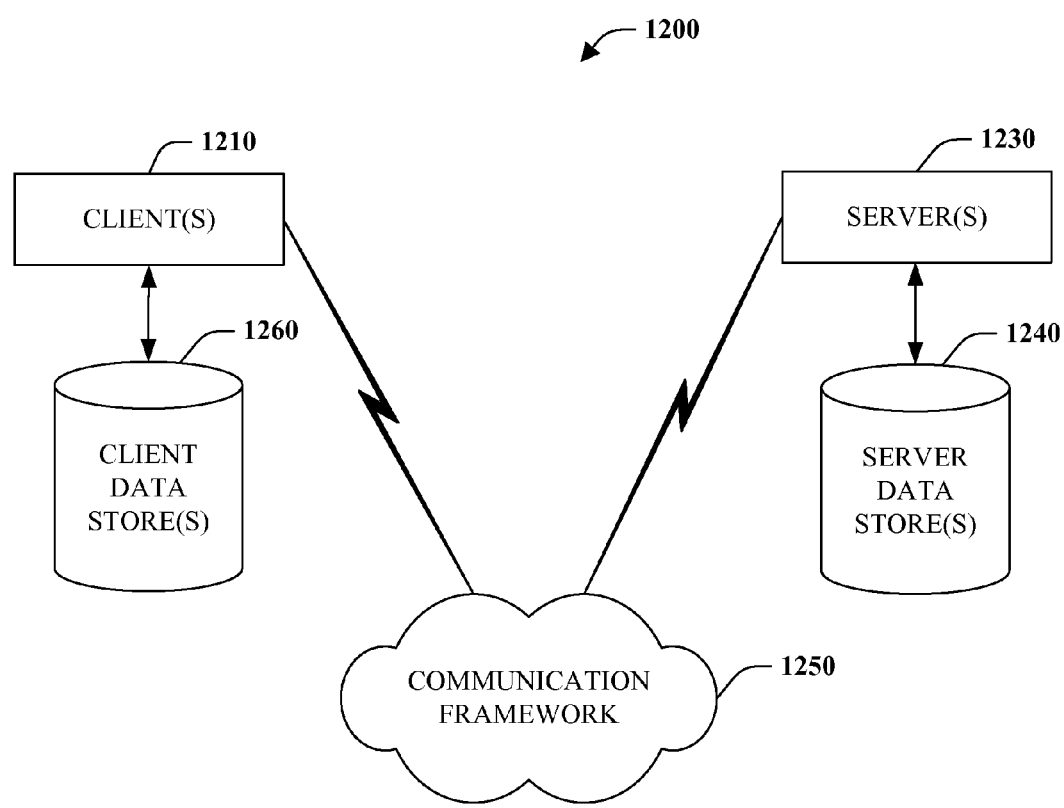
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116 and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/non-volatile computer storage media. FIG. 11 illustrates, for example, mass storage 1124. Mass storage 1124 includes, but is not limited to, devices like a magnetic or optical disk drive, floppy disk drive, flash memory or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112.

By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g., CRT, LCD, plasma . . . ), speakers, printers and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. Here, the client(s) can correspond to game participant computing devices and the server(s) can provide the functionality of the game based information collection systems, as previously described. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230. By way of example, a user can login to one or more servers 1230 via a client 1210 and provide the profile including information about the user that they are willing to share with other game participants. The server(s) 1230 can persist this information to data store(s) 1240. Subsequently, network connected participants can be linked together and a game session initiated by the server(s) 1230. Subsequent to or concurrent with game play, information about participants housed in the server data store(s) can be revealed by the server(s) 1230 to other participants via their respective client(s) 1210.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. An information collection system, comprising:
a memory;
one or more processors operatively coupled to the memory and disposed within a device;
a game component disposed within the device that provides a network game by engaging participants to participate anonymously to play in the network game, and the network game is designed to collect human categorization of information from the participants;
a reward component that reveals social information about one of the participants to at least one other participant to encourage game play, the social information includes at least one of a name, a gender, an ethnicity, a marital status, a political affiliation, or a location; and
a points management component that assigns points to a participant based on at least one of participation and/or game score that can be employed to purchase a right to reveal the social information.

2. The system of claim 1, further comprising a communication component that enables limited communication between the participants during the game to engage the participants while still requiring the game play to reveal the social information.

3. The system of claim 1, further comprising an acquisition component that scrapes the social information from one or more web pages or blogs.

4. The system of claim 1, further comprising an acquisition component that acquires the social information from participants via quiz questions that are fun to answer.

5. The system of claim 1, further comprising a login component to facilitate participant identification and game session pairings.

6. The system of claim 1, the points management component decrements participant points an amount as payment for revealed social information.

7. The system of claim 1, the game component provides a game that facilitates categorization of at least one of emails, web pages and/or images.

8. The system of claim 1, the reward component reveals information, about one of the participants to the at least other participant, solely of a type that the one participant has provided.

9. An information gathering method, comprising:
collecting human observations, executed on one or more processors within a device and operatively coupled to a memory, with respect to one or more data items from participants via an online game that is played among the participants that participate anonymously to play in the online game;
rewarding the participants with social information about other participants, the social information includes at least one of a name, a gender, an ethnicity, a marital status, a political affiliation, or a location;
rewarding the participants with points that can be exchanged for the social information about the other participants; and
further rewarding the participants with bonus points based on at least speed of matching answers with related questions.

10. The method of claim 9, further comprising scrapping the social information from at least one of a web page and/or a blog.

11. The method of claim 9, rewarding the participants with information of a type provided by the participants themselves.

12. The method of claim 9 further comprising, exchanging points for increased picture resolution.

13. The method of claim 9, further comprising selecting game session participants based on characteristics requested by the participants.

14. The method of claim 9, the one or more data items are images and the human observations are words descriptive of the images.

15. The method of claim 9, the one or more data items are web pages and the human observations include relevancy rankings.

16. The method of claim 9, the one or more data items are electronic messages and the observations identify the electronic messages as spam or non-spam.

17. One or more computer storage media comprising computer-executable instructions that, when executed by a device, perform a method comprising:
   collecting human evaluations of data from at least a pair of participants via a network game played among the pair of participants that participate in a semi-anonymous manner in the network game;
   revealing social information about other participants to the pair of participants to encourage game participation, the social information includes at least one of a name, a gender, an ethnicity, a marital status, a political affiliation, or a location; and
   rewarding the pair of participants with points based on the game participation or game score that can be exchanged for the social information about the other participants.

18. The system of claim 17, further comprising regulating information revealed as a function of game participation and/or game performance.

* * * * *